J. M. LONTZ.
BEARING FOR LAWN MOWERS.
APPLICATION FILED JUNE 23, 1916.
1,298,980.
Patented Apr. 1, 1919.
2 SHEETS—SHEET 2.
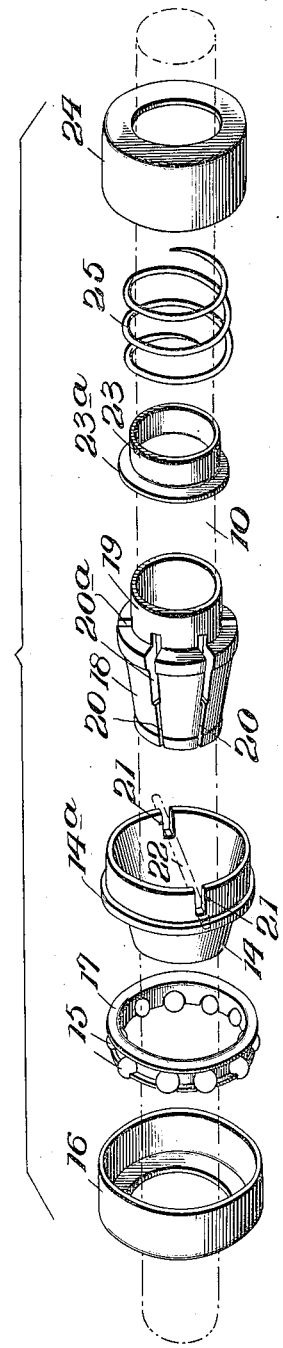
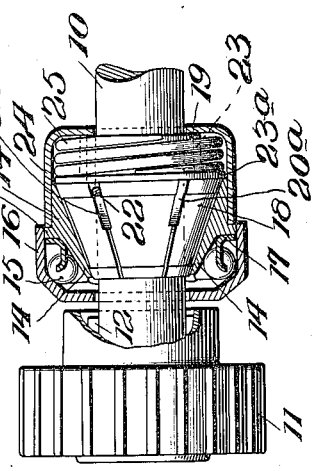
Inventor
John M. Lontz,
By Mauro, Cameron, Lewis & Massie
Attorneys

UNITED STATES PATENT OFFICE.

JOHN M. LONTZ, OF RICHMOND, INDIANA.

BEARING FOR LAWN-MOWERS.

1,298,980.　　　　　Specification of Letters Patent.　　Patented Apr. 1, 1919.

Application filed June 23, 1916. Serial No. 105,492.

*To all whom it may concern:*

Be it known that I, JOHN M. LONTZ, a citizen of the United States of America, and a resident of Richmond, Indiana, have invented a new and useful Improvement in Bearings for Lawn-Mowers, which invention is fully set forth in the following specification.

The present invention is an improvement in bearings and particularly the bearings of a lawn mower; and is an improvement on the construction disclosed in U. S. Patent No. 1,031,417, dated July 2, 1912.

The object of the invention is to provide an improved bearing of the type set forth in the above-mentioned patent, having greater strength, durability and other advantages.

In the accompanying drawings, which illustrate the preferred embodiment of the invention—

Fig. 2 is a side view of the bearing, partly in section;

Fig. 3 is a view showing the several parts of the bearing pulled out or extended one from another.

Figure 1:
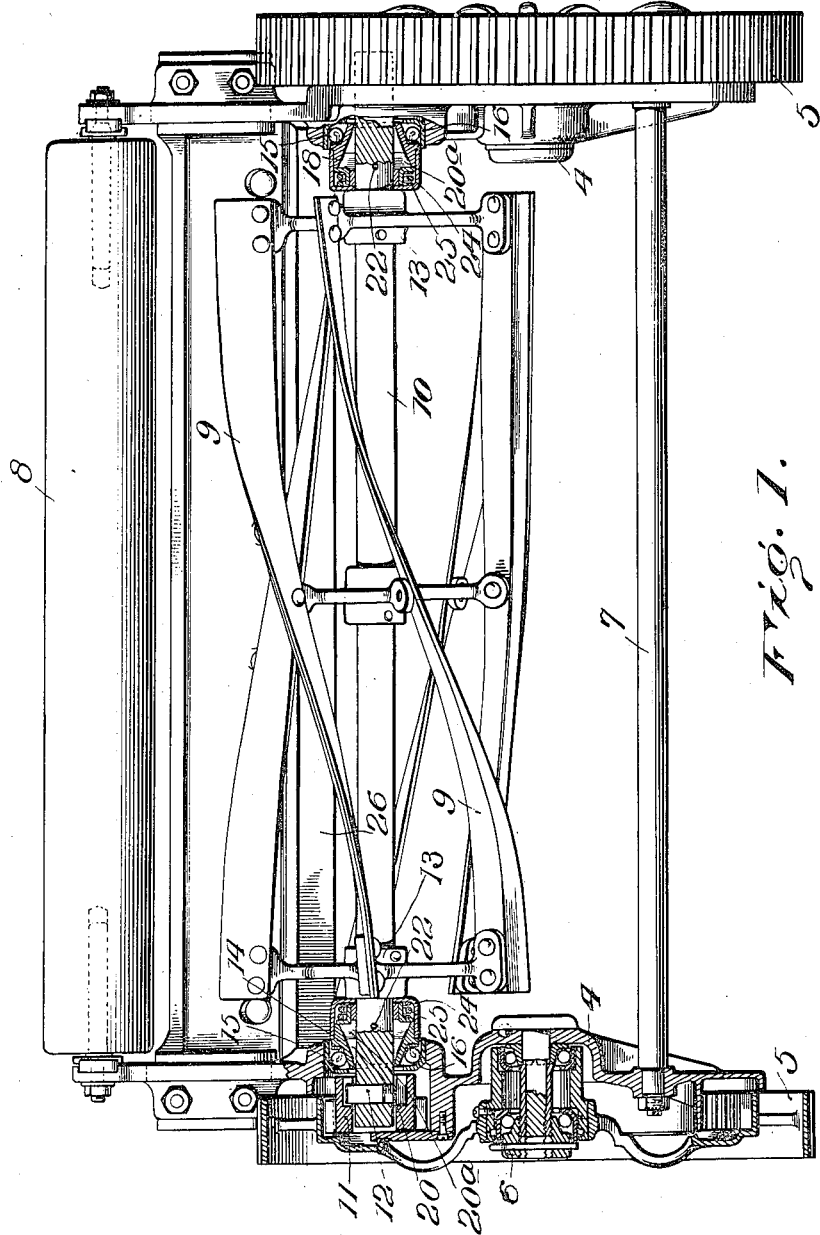
Figure 1 is a plan view, partly in section, of a lawn mower embodying the invention.

Referring to the drawings, 4—4 represent the two side frames of the machine, these being mounted on suitable ground wheels 5—5 by means of bearings of which one is shown at 6. 7 is a rod connecting the two side frames together, and 8 is the usual ground roller.

The shaft for the rotary cutter blades 9—9 is indicated at 10. This shaft is mounted in the side frames 4—4, and on each end carries a pinion 11 which meshes with an internal annular gear carried by the corresponding ground wheel 5. In a recess at each end of the shaft 10 is mounted a pawl 12 adapted to engage suitable teeth formed on the interior of the hub of the corresponding pinion 11. The two pawls 12, by engaging the pinions, serve to turn the shaft 10 in one direction but not in the other.

The blades of the rotary cutter are suitably secured to hubs 13—13 which are fixed to the shaft 10 in any desired manner. Surrounding the shaft 10 at each end thereof is a bearing member 14, this member preferably constituting the inner raceway of a ball bearing. In the preferred construction the raceway 14 is engaged by balls 15 which also engage a raceway 16 carried by the corresponding frame 4. Preferably the balls are separated and controlled by means of a cage 17.

The interior aperture of the bearing member 14 is conical, its walls converging toward the outside of the machine. 18 is a collapsible sleeve having an inner cylindrical surface adapted to engage the surface of the shaft 10, and an outer conical surface adapted to engage the inner conical surface of the bearing member 14. The sleeve 18 is provided with a continuous hub or collar 19 which closely fits the shaft, and the main body part of the sleeve is provided with slots 20 which preferably extend the entire length thereof and for short distances into the collar 19. Preferably each of the slots 20 is provided with an enlarged or widened portion at 20$^a$. The bearing member 14 is provided with oppositely disposed notches 21—21 adapted to register, when the parts are assembled, with two of the widened portions 20$^a$ of the slots in the sleeve 18. A pin 22 extends through the shaft 10 and into the said slot parts 20$^a$ and the said notches 21, thus causing the said sleeve and bearing member to turn with the shaft, but leaving them free to move longitudinally thereof.

The sleeve 18 is relatively flexible because of the slots formed therein, it being adapted to firmly grip the shaft 10 upon the application of a slight inward pressure to the outer surface. Preferably the sleeve is formed of phosphor bronze; and, because of its peculiar slotted construction and because of the material from which it is formed, is quite fragile and easily broken both in assembling and in use. In order to guard against the breaking of the sleeve, which performs a function of great importance in the bearing and which must be very sensitive, I provide a steel ring or thimble 23 which closely fits the collar 19 and serves to effectively reinforce the delicate sleeve 18 and prevent breakage thereof. In engagement with the corresponding hub 13 is a casing 24 which is formed to extend outward so as to inclose the thimble 23 and parts of the sleeve 18 and the bearing member 14. Preferably the bearing member 14 is provided with a flange at 14$^a$ with which the edge of the casing coöperates.

Positioned within the casing 24 and interposed between a flange 23$^a$ on the thimble 23 and the inner wall of the casing 24 is a coil compression spring 25. This spring, acting through the thimble 23 and the sleeve 18, serves to move the bearing member 14 outward into firm engagement with the balls 15, thus keeping the bearing tight and compensating for wear. The construction of the sleeve 18 is such that it prevents the spring from exerting too great a pressure on the member 14. As already stated, the sleeve tends to firmly grip the shaft 10 when pressure is applied to its outer surface, and the result is that as soon as the spring 25 acts, its pressure is applied not only to the member 14, but also by reaction to the outer surface of the sleeve, thus causing the sleeve to grip the shaft and limit further movement. By reason of this novel construction, the spring 25 constantly serves to keep the bearing tight and take up wear, but is prevented from exerting a constant pressure on the bearing which would cause undue friction and excessive wear.

From the foregoing description it will be seen that the construction which I have provided serves to constantly keep the bearing tight, thus preventing any movement of the shaft and of the knives carried thereby out of their true rotative position. In a lawn mower it is essential that the rotating knives have a light brushing engagement with the stationary knife which is indicated in the drawings at 26, and in order to insure this proper contact it is essential that the axis of rotation be maintained absolutely fixed. By my improved construction I not only accomplish this result, but also provide a bearing which is very strong and durable and is capable of resisting severe shocks and hard usage.

In order that the invention may be clearly understood, I have shown and described with some particularity the embodiment thereof which I now deem preferable, but it will be understood that the invention can be embodied in other ways within the scope of the appended claims.

While the invention is herein particularly shown and described with respect to preventing undue binding of the bearings of the shaft for the rotating knife of a lawn mower, it will be understood that the invention is not limited to this use, but that the improved bearing may be used in association with the ground wheels, and indeed wherever it is desired to maintain bearing elements in proper engagement.

What is claimed is:—

1. In combination, a rotary member, bearing elements for said member, a spring arranged to move one of said elements with relation to the other, and a collapsible sleeve interposed between said spring and its associated element for controlling the application of power of said spring, and a ring surrounding one end of the sleeve and movable therewith.

2. In combination, a rotary member, bearing elements for said member, a spring arranged to move one of said elements with relation to the other, and a collapsible sleeve interposed between said spring and its associated element for controlling the application of power of said spring, the said sleeve having longitudinal slots at one end and being circumferentially continuous at the other end.

3. In combination, a rotary member, bearing elements for said member, a spring arranged to move one of said elements with relation to the other, a collapsible sleeve interposed between said spring and its associated element for controlling the application of power of said spring, the said sleeve having longitudinal slots at one end and being circumferentially continuous at the other end, and a ring closely fitting the continuous end of the sleeve and movable therewith.

4. In combination, a rotary member, bearing elements for said member, a spring arranged to move one of said elements with relation to the other, a collapsible sleeve interposed between said spring and its associated element for controlling the application of power of said spring, the said sleeve having longitudinal slots at one end and being circumferentially continuous at the other end, a pin secured to the shaft and extending into one of the said slots, and a ring closely fitting the continuous end of the sleeve and movable therewith.

In testimony whereof I have signed this specification.

JOHN M. LONTZ.